(12) United States Patent
Terasaki

(10) Patent No.: US 7,496,507 B2
(45) Date of Patent: Feb. 24, 2009

(54) DIGITIZED AUDIO DATA REPRODUCTION APPARATUS, AND INTEGRATED CIRCUIT DEVICE TO OUTPUT AUDIO SIGNALS

(75) Inventor: Setsuo Terasaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 773 days.

(21) Appl. No.: 11/073,634

(22) Filed: Mar. 8, 2005

(65) Prior Publication Data

US 2005/0256707 A1 Nov. 17, 2005

(30) Foreign Application Priority Data

Mar. 31, 2004 (JP) .......................... P2004-108083

(51) Int. Cl.
*G10L 19/00* (2006.01)

(52) U.S. Cl. .................................... 704/228

(58) Field of Classification Search ................. 704/228
See application file for complete search history.

(56) References Cited

U.S. PATENT DOCUMENTS

| 5,155,743 A | 10/1992 | Jacobs |
| 5,867,819 A | 2/1999 | Fukuchi et al. |
| 5,896,358 A | 4/1999 | Endoh et al. |
| 6,016,295 A | 1/2000 | Endoh et al. |
| 6,272,153 B1 | 8/2001 | Huang et al. |
| 2002/0015504 A1 | 2/2002 | Kohno et al. |

FOREIGN PATENT DOCUMENTS

| CN | 153367 A | 7/1997 |
| JP | 09-252254 | 9/1997 |
| JP | 11-306666 | 11/1999 |
| JP | P2002-56611 A | 2/2002 |
| JP | 3094993 | 4/2003 |
| WO | WO 03/086017 A2 | 10/2003 |

*Primary Examiner*—Susan McFadden
(74) *Attorney, Agent, or Firm*—Oblon, Spivak, McClelland, Maier & Neustadt, P.C.

(57) ABSTRACT

An audio data reproduction apparatus, integrated circuit device, and computer program product configured to implement a method for reproducing audio data that includes receiving an audio stream, decoding the audio stream, processing the audio stream or a signal produced by the decoding, selecting the signal produced by the decoding or a signal produced by the processing, and outputting the audio stream, the signal produced by the decoding, or the signal produced by the processing.

20 Claims, 4 Drawing Sheets

DIGITIZED AUDIO DATA REPRODUCTION APPARATUS, AND INTEGRATED CIRCUIT DEVICE TO OUTPUT AUDIO SIGNALS

CROSS-REFERENCE TO RELATED APPLICATIONS

This application is based upon and claims the benefit of priority from the prior Japanese Patent Application No. P2004-108083, filed on Mar. 31, 2004, the entire contents of which is incorporated herein by reference.

FIELD OF THE INVENTION

This invention relates to a digitized audio data reproduction apparatus, an integrated circuit device to output an audio signal, and a method of reproducing digitized audio data.

BACKGROUND OF THE INVENTION

In a DVD reproduction apparatus, the digitized audio data read from a disc such as a CD (Compact Disc) and DVD (Digital Versatile Disc) is reproduced in a reproduction circuit, and an error correction is provided to the reproduced data in a correction circuit. The audio stream extracted from the data using reproduction and correction is supplied to an audio processing circuit.

When the audio stream is compressed coded data, the audio stream is decoded into PCM (Pulse Code Modulation) audio data in an audio processing circuit and then output to a postprocessing circuit through a selector. On the other hand, when the audio stream is PCM audio data, the audio stream itself is output to the postprocessing circuit through the selector. An example of the DVD reproduction apparatus is shown in U.S. Pat. No. 6,272,153.

At the output of the postprocessing circuit, one of the PCM audio data in which postprocessing such as virtual surround, pro logic, etc. has been performed or the PCM audio data supplied to the postprocessing circuit, is selected and output. The signal output from the postprocessing circuit is converted into an analog audio signal through a digital-to-analog conversion (DAC) circuit, amplified in an amplifying circuit and supplied to an audio speaker.

Furthermore, one of the audio stream or the output signal from the postprocessing circuit is selected and the selected output signal is converted in the IEC958 transceiver into a digital signal which conforms to the format IE060958 or IEC61987 which is a telecommunications standard of digitized audio data (hereinafter, IEC958 signal). The compressed coded data is output as the IEC958 signal from the IEC958 transceiver when the audio stream is selected, and the PCM audio data is output as the IEC958 signal from the IEC958 transceiver when the output data from the postprocessing circuit is selected.

In the case of the IEC958 signal, only two-channels of PCM data can be included in the IEC958 signal. For this reason, in the case of the PCM audio data of 5.1 multichannels (L, R, C, Ls, Rs, and LFE) with which the postprocessing has been performed in the conventional DVD reproduction apparatus, only two-channels (L, R) can be included in the digitized audio data output from the IEC958 transceiver.

When an external DAC receives a digital output of an IEC958 signal with which the postprocessing has been performed and converts the signal into an analog audio signal, the elements (L, R) are provided, but the elements of Center (C), Left and Right rear surround (Ls, Rs), and Low Frequency Effect (LFE) are lost. Moreover, when an IEC958 signal with which the postprocessing has been performed is recorded by external equipment, only the digital audio signal including the elements (L, R) can be recorded and the elements of Center (C), Left and Right rear surround (Ls, Rs), and Low Frequency Effect (LFE) are lost.

Moreover, in the conventional DVD reproduction apparatus, when virtual surround processing is performed on the PCM audio data of an original sound in a postprocessing circuit, the digitized audio data signal output from the apparatus is a signal that has been subjected to the virtual surround processing. Therefore, when such a digital output signal is recorded by external equipment, the recorded signal is a signal that has been subjected to the virtual surround processing and is not the original sound.

BRIEF SUMMARY OF THE INVENTION

In part, due to the above deficiencies in the art, the present invention has been made to solve or minimize the above-explained problems. Therefore, according to one aspect of the present invention there is provided an audio data reproduction apparatus including a decoder circuit configured to decode an audio stream including coded data, a postprocessing circuit configured to process at least one of the audio stream and a signal output from the decoder circuit, a first selector configured to select at least one of a signal input to the postprocessing circuit and a signal output from the postprocessing circuit, and a second selector configured to select at least one of the audio stream, the signal output from the decoder circuit, and the signal output from the postprocessing circuit.

According to another aspect of the present invention there is provided an integrated circuit device including a decoder circuit configured to decode an audio stream including coded data, a postprocessing circuit configured to process at least one of the audio stream and a signal output from the decoder circuit, a first selector configured to select at least one of a signal input to the postprocessing circuit and a signal output from the postprocessing circuit, and a second selector configured to select at least one of the audio stream, the signal output from the decoder circuit, and the signal output from the postprocessing circuit.

According to a further aspect of the present invention there is provided a method for reproducing audio data including the steps of receiving an audio stream including coded data, decoding the audio stream, processing at least one of the audio stream and a signal produced by the decoding, selecting at least one of the signal produced by the decoding and a signal produced by the processing, and outputting at least one of the audio stream, the signal produced by the decoding, and the signal produced by the processing.

According to a further aspect of the present invention there is provided a computer program product storing computer program instructions which when executed by a computer causes performance of a method for reproducing audio data including the steps of receiving an audio stream including coded data, decoding the audio stream, processing at least one of the audio stream and a signal produced by the decoding, selecting at least one of the signal produced by the decoding and a signal produced by the processing, and outputting at least one of the audio stream, the signal produced by the decoding, and the signal produced by the processing.

BRIEF DESCRIPTION OF THE DRAWINGS

A more complete appreciation of embodiments of the present invention and many of its attendant advantages will be readily obtained by reference to the following detailed description considered in connection with the accompanying drawings, in which.

DETAILED DESCRIPTION OF THE EMBODIMENTS

Hereinafter, with reference to drawings, embodiments of the present invention of the digitized audio data reproduction apparatus are explained.

(1) First Embodiment

Figure 1:
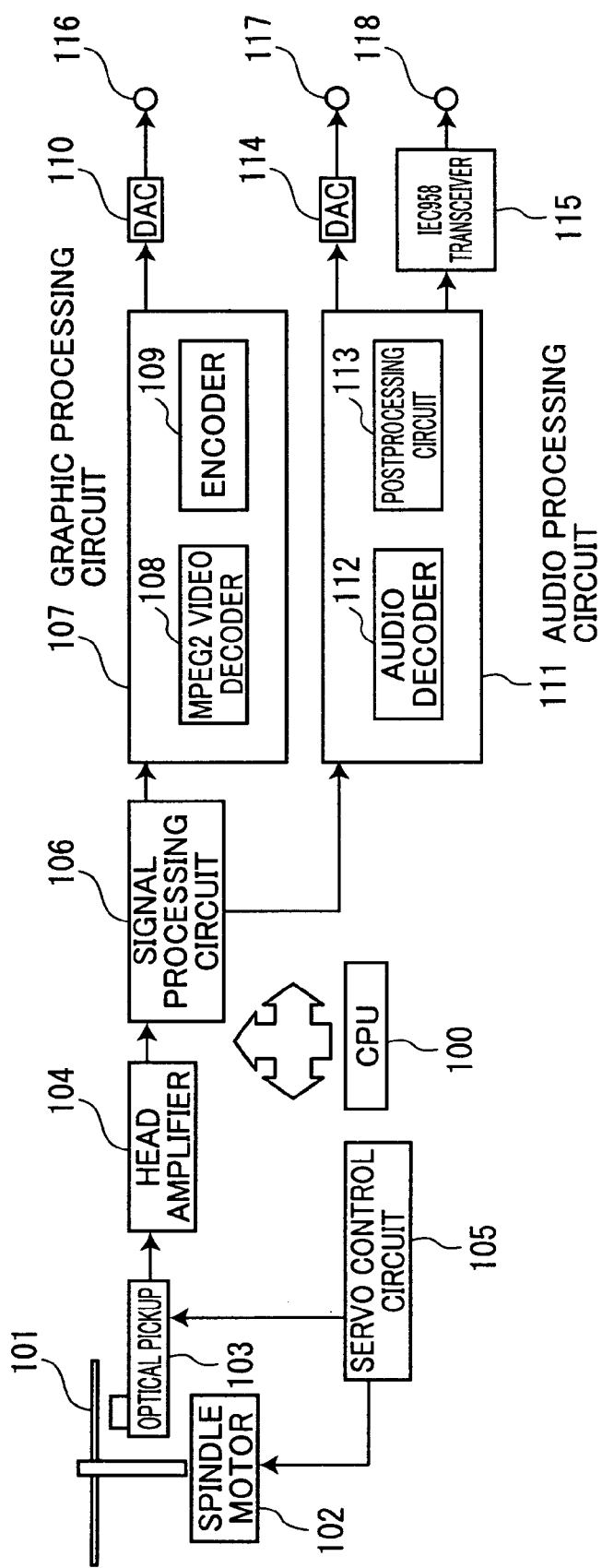
FIG. 1 is a block diagram showing the digitized audio data reproduction apparatus of a first embodiment.

FIG. 1 is the block diagram showing the digitized audio data reproduction apparatus of the first embodiment. In FIG. 1, each section block of the digitized audio data reproduction apparatus is controlled by a control unit CPU 100. The disc 101 is a recorded medium, such as a CD or DVD, rotated by a spindle motor 102. An optical pickup 103, including a semiconductor laser, photoelectric conversion element, etc., is a signal extraction component for reading the data currently recorded on the disc 101 and outputting the data as an electrical signal, by applying light to a truck during rotation of the disc 101 and detecting the diversification of the quantity of light which penetrated the truck or reflected and returned from the truck of the disc.

A head amplifier 104 performs amplification and waveform-equalization processing of the output signal from the optical pickup 103, extracts a focal error signal and a tracking error signal from the signal, supplies the extracted data to a servo control circuit 105 and supplies a digitized data signal to a signal processing circuit 106. The signal processing circuit 106 performs reproduction processing for reproducing the data signal modulated so that the data signal is easy to record on a disc in the original form, error correction processing for the reproduced data signal, and outputting the corrected data signal as a digitized data signal.

While an image data, a sound data, and a title data are each equipped with an identifier, these data become one digitized data signal and the signal is recorded on a DVD. Therefore, it is necessary to perform stream separation of the digitized data signal according to the identifiers. The image stream extracted from the digitized data signal is supplied to a graphic-processing circuit 107. In the graphic-processing circuit 107, the image stream supplied to an MPEG 2 video decoder 108 is decoded into original image data. Since the decoded image data is color difference data, after being encoded by an NTSC color television system or the PAL system by an encoder 109, they are supplied to a DAC 110. The output signal from the DAC 110 is video-data output that is output through a video-data output terminal 116.

On the other hand, the audio stream extracted from said digitized data signal or the audio stream which is said digitized data signal is supplied to an audio processing circuit 111. In the audio processing circuit 111, when an audio stream is coded data, the audio stream is supplied to an audio decoder circuit 112 corresponding to the coding method, and the audio stream is decoded into original PCM audio data.

In a postprocessing circuit 113, postprocessing such as virtual surround, pro logic, etc, is performed on the PCM audio data. In the audio processing circuit 111, the PCM audio data with which the postprocessing has not been performed in the postprocessing circuit 113 or the PCM audio data with which the postprocessing has been performed in the postprocessing circuit 113 is selected and output. This digital output from the audio processing circuit 111 is supplied to a DAC 114. The output from the DAC 114 is an analog audio data output, and the analog audio data output is supplied to an audio speaker system or a headphone system through an analog audio data output terminal 117 of the audio data reproduction apparatus.

Furthermore, in the audio processing circuit 111, one of the output signals from the audio decoder circuit 112, the postprocessing circuit 113, and the audio stream is selected and output. The digital signal output from the audio processing circuit 111 is supplied to an IEC958 transceiver 115 which is a data-conversion circuit corresponding to the telecommunications standard of digitized audio data. In the IEC958 transceiver, the supplied digital signal is converted into a digital signal conforming with the format IEC60968 or IEC61937 (hereinafter, IEC958 signal). In addition, the conversion into the digital signal conforming with the telecommunications standard of digitized audio data is not only a data conversion resulting in a signal that completely conforms with this telecommunications standard . A conversion in which only a portion of a digital signal applied to the specification conforms with the standard is also included. For example, the digital signal output from the IEC958 transceiver 115 may partially conform with the IEC958 specification. In this case, the conversion into the digital signal completely conforming with the IEC958 specification can be performed by combining another circuit which partially conforms with the IEC958 specification.

The digital signal output from the IEC958 transceiver is output through a digitized audio data output terminal 118 of the audio data reproduction apparatus. In addition, although the PCM audio data of two-channels will usually be supplied to the IEC958 transceiver 115, when the PCM audio data of 5.1 multi-channels is supplied to the IEC958 transceiver, only PCM audio data of two-channels L and R on the specification in 5.1 multi-channels data will be selected, and an output conversion is performed.

Figure 2:
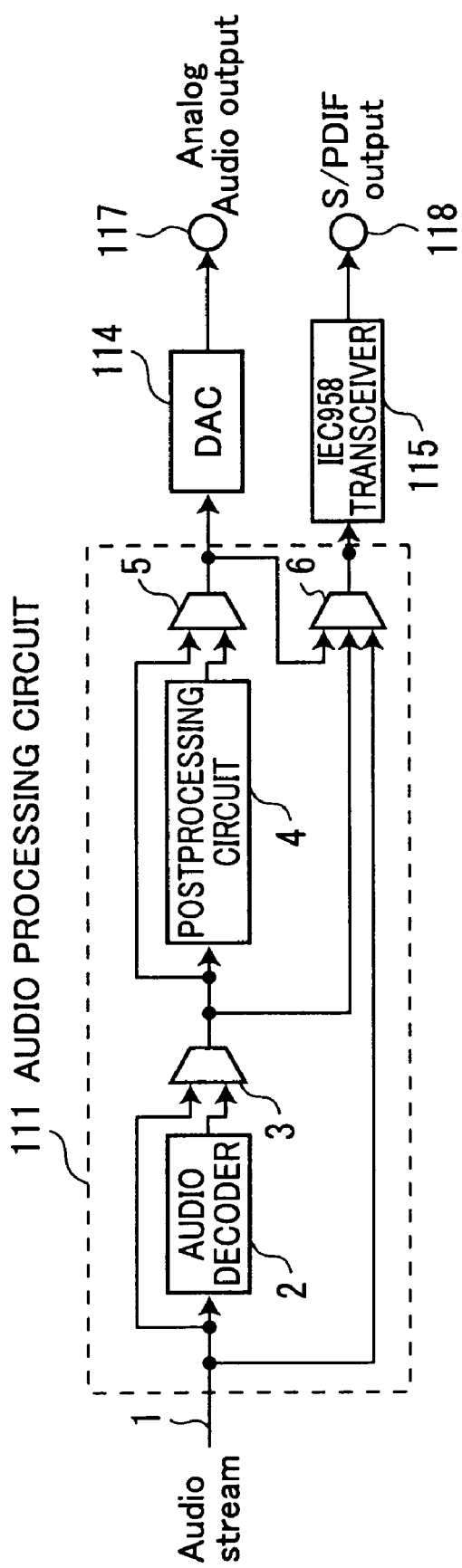
FIG. 2 is a block diagram showing the audio processing circuit in the digitized audio data reproduction apparatus of the first embodiment.

FIG. 2 is the block diagram showing the audio processing circuit 111 of the first embodiment. The audio stream 1 supplied from the signal processing circuit 106 shown in FIG. 1 is supplied to an audio decoder circuit 2 and a selector 3. When the audio stream 1 is coded data, the audio stream 1 is decoded into PCM audio data of two-channels (stereo) by the audio decoder circuit 2 corresponding to the coding method. The PCM audio data decoded by the audio decoder circuit 2 is supplied to the selector 3.

In the selector 3, one of the input PCM audio data is selected and output. When the input PCM audio data of two-channels is input with the audio stream 1 which is not encoded, the audio stream 1 is selected and output by the selector 3. The PCM audio data output from the selector 3 is supplied to a postprocessing circuit 4 and a selector 5. In the postprocessing circuit 4, processing such as virtual surround by two-channels, pro logic, etc. is performed on the supplied PCM audio data. The PCM audio data with which the postprocessing is performed in the postprocessing circuit 4 is supplied to the selector 5.

In the selector 5, one of the PCM audio data with which the postprocessing has not been performed and the PCM audio data with which the postprocessing has been performed in the postprocessing circuit 4 is selected and output. The PCM audio data output from the selector 5 is supplied to the DAC 114 for the analog audio data output. Moreover, the audio stream 1, the PCM audio data output from the selector 3 and the PCM audio data output from the selector 5 are supplied to a selector 6.

Here, the PCM audio data output from the selector 3 is the audio stream 1 or the PCM audio data decoded by the audio decoder circuit 2. Moreover, the PCM audio data output from the selector 5 is the signal output from the postprocessing circuit 4 or the signal output from the selector 3 supplied to the postprocessing circuit 4. That is, the audio stream 1, the PCM audio data decoded by the audio decoder circuit 2 and the PCM audio data output from the postprocessing circuit 4 are supplied to the selector 6.

In the selector 6, one of the input signals is selected and output, and the selected output signal is supplied to the IEC958 transceiver 115. In the selector 6, the audio stream 1 is output as the digital data when the audio stream 1 is selected, the decoded PCM audio data with which the postprocessing has not been performed is output when the PCM audio data output from the selector 3 is selected, and the PCM audio data with which the postprocessing has been performed is output when the PCM audio data from the selector 5 is selected.

According to the first embodiment, the PCM audio data having two-channels with which the pro logic processing has not been performed is supplied to the IEC958 transceiver even when the pro logic processing is performed by the postprocessing of the PCM audio data in the postprocessing circuit for an analog audio data output.

Therefore, it is possible to reproduce the original audio data containing the elements of Left and Right (L, R), Center (C), Left and Right rear surround (Ls, Rs), and Low Frequency Effect (LFE) at any time when an external DAC receives the digitized audio data output from the IEC958 transceiver. Moreover, it is possible to record the original audio data containing the elements of Left and Right (L, R), Center (C), Left and Right rear surround (Ls, Rs), and Low Frequency Effect (LFE) at any time when recording the digitized audio data output from the IEC958 transceiver with external equipment.

Similarly, it is possible to supply the IEC958 transceiver the PCM audio data with which the virtual surround processing has not been performed even when virtual surround processing has been performed on the PCM audio data in the postprocessing circuit. Therefore, it is possible to record the original audio data with which the virtual surround processing has not been performed at any time when recording the digitized audio data output from the IEC958 transceiver with external equipment.

The audio processing circuit 111 of this first embodiment is an integrated-circuit device by which circuit formation is carried out on a semiconductor substrate. As this integrated-circuit device, the DAC 114, the IEC958 transceiver 115, or both may be formed on one chip along with the audio processing circuit 111. Moreover, the added processing circuit 111 may be constituted as one package including two or more chips having different circuit functions.

(2) Second Embodiment

Only the internal composition of the audio processing circuit 111 of the second embodiment is explained because only the internal composition of the audio processing circuit 111 of the second embodiment is different from the first embodiment shown in FIG. 1.

Figure 3:
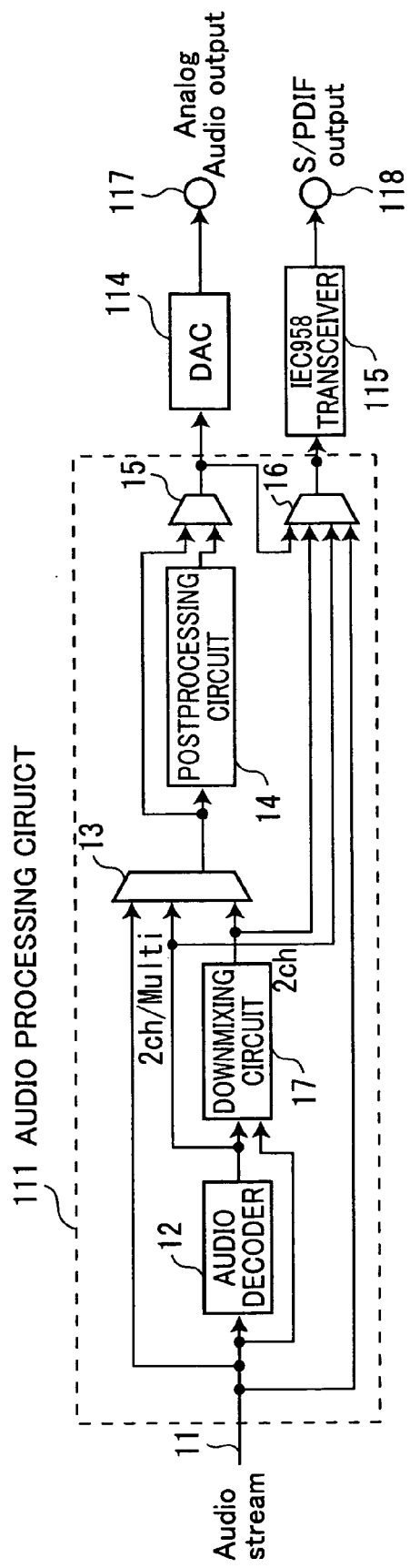
FIG. 3 is a block diagram showing the audio processing circuit in the digitized audio data reproduction apparatus of a second embodiment.

FIG. 3 is a block diagram showing the audio processing circuit 111 in the digitized audio data reproduction apparatus of the second embodiment. The audio stream 11 supplied from the signal processing circuit 106 of FIG. 1 is supplied to an audio decoder circuit 12 and a selector 13. When the audio stream 11 is coded data, the audio stream 11 is decoded into PCM audio data by the audio decoder circuit 12 corresponding to the coding method. The PCM audio data decoded by the audio decoder circuit 12 is supplied to the selector 13.

When the decoded PCM audio data is the PCM audio data of 5.1 multi-channels, the decoded PCM audio data is also supplied to a downmixing circuit 17 and downmixing is performed on the PCM audio data. Then the downmixing circuit 17 outputs the PCM audio data of two-channels. Moreover, when the audio stream 11 is not encoded and is the PCM audio data of 5.1 multi-channels, the audio stream 11 is supplied to the downmixing circuit 17 and downmixing processing is performed on the audio stream 11. Then the downmixing circuit 17 outputs the PCM audio data of two-channels.

The output from the downmixing circuit 17 is supplied to the selector 13. In the selector 13, one of the input PCM audio data is selected and output. The PCM audio data of two-channels or the PCM audio data of 5.1 multi-channels output from the selector 13 is supplied to a postprocessing circuit 14 and a selector 15.

In the postprocessing circuit 14, processing such as virtual surround, pro logic, etc. is performed on the supplied PCM audio data of two-channels. The PCM audio data with which the postprocessing has been performed in the postprocessing circuit 14 is supplied to the selector 15. In the selector 15, one of the PCM audio data with which the postprocessing has been performed and the PCM audio data with which the postprocessing has not been performed in the postprocessing circuit 14 is selected and output.

The PCM audio data output from the selector 15 is supplied to the DAC 114 for the analog audio output. Moreover, the audio stream 11, the PCM audio data output from the audio decoder circuit 12, the PCM audio data output from the downmixing circuit 17 and the PCM audio data output from the selector 15 are supplied to a selector 16. Here, the PCM audio data output from the selector 15 is the signal output from the postprocessing circuit 14 or the signal output from the selector 13 supplied to the postprocessing circuit 14. In other words, the audio stream 11, the PCM audio data decoded by the audio decoder circuit 12, the PCM audio data output from the downmixing circuit 17 and the PCM audio data output from the postprocessing circuit 14 are supplied to the selector 16.

In the selector 16, one of the input signals is selected and output, and the selected output signal is supplied to the IEC958 transceiver 115. In the selector 16, the coded data or the PCM audio data is output as the digital data when the audio stream 11 is selected, the PCM audio data of two-channels with which the decoding processing has been performed and the postprocessing has not been performed is output when the PCM audio data output from the audio decoder circuit 12 or the downmixing circuit 17 is selected, and the PCM audio data with which the postprocessing has been performed is output when the PCM audio data output from the selector 15 is selected.

According to the second embodiment, the PCM audio data of two-channels with which the pro logic processing has not been performed is supplied to the IEC958 transceiver even when the pro logic processing is performed by the postprocessing on the PCM audio data in the postprocessing circuit for an analog audio data output.

Therefore, it is possible to reproduce the original audio data containing the elements of Left and Right (L, R), Center (C), Left and Right rear surround (Ls, Rs), and Low Frequency Effect (LFE) at any time when an external DAC receives the digitized audio data output from the IEC958 transceiver. Moreover, it is possible to record the original audio data containing the elements of Left and Right (L, R), Center (C), Left and Right rear surround (Ls, Rs), and Low Frequency Effect (LFE) at any time when recording the digitized audio data output from the IEC958 transceiver with external equipment.

Similarly, it is possible to supply the IEC958 transceiver the PCM audio data with which the virtual surround processing has not been performed even when virtual surround processing has been performed on the PCM audio data in the postprocessing circuit. Therefore, it is possible to record the original audio data with which the virtual surround processing has not been performed at any time when recording the digitized audio data output from the IEC958 transceiver with external equipment.

Moreover, according to the second embodiment, in addition to the effect obtained by the first embodiment, it is possible to supply the IEC958 transceiver the PCM audio data of two-channels with which the downmixing processing has been performed even when the audio stream itself is the PCM audio data of 5.1 multi-channels or the PCM audio data output from the audio decoder circuit is the PCM audio data of 5.1 multi-channels.

Therefore, it is possible to reproduce the original audio data containing the elements of Left and Right (L, R), Center (C), Left and Right rear surround (Ls, Rs), and Low Frequency Effect (LFE) at any time when an external DAC receives the digitized audio data output from the IEC958 transceiver. Similarly, it is possible to record the original audio data containing the element of Left and Right (L, R), Center (C), Left and Right rear surround (Ls, Rs), and Low Frequency Effect (LFE) at any time when recording the digitized audio data output from the IEC958 transceiver with external equipment.

The audio processing circuit 111 of this second embodiment is constituted as an integrated-circuit device by which circuit formation is carried out on a semiconductor substrate. As this integrated-circuit device, the DAC 114, the IEC958 transceiver 115, or both may be formed on one chip along with the audio processing circuit 111. Moreover, the audio processing circuit may be constituted as one package including two or more chips having different circuit functions.

(3) Third Embodiment

The internal composition of the audio processing circuit 111 of the third embodiment is explained since only the internal composition of the audio processing circuit 111 of the third embodiment is different from the first embodiment shown in FIG. 1.

Figure 4:
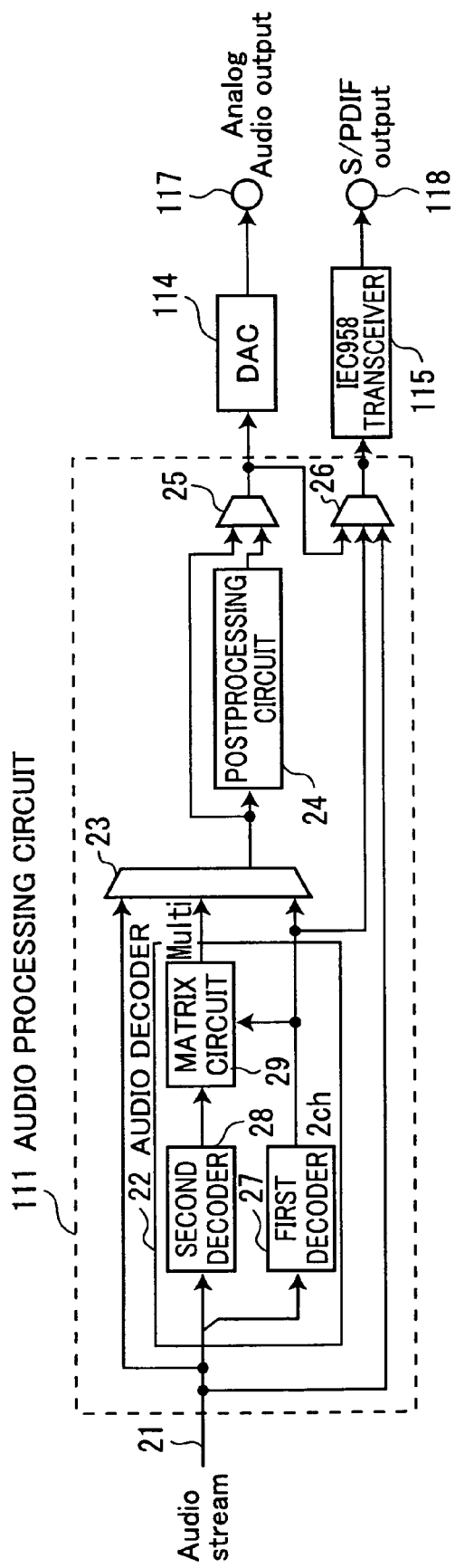
FIG. 4 is a block diagram showing the audio processing circuit in the digitized audio data reproduction apparatus of a third embodiment.

FIG. 4 is a block diagram showing the audio processing circuit 111 in the digitized audio data reproduction apparatus of the third embodiment. The audio stream 21 supplied from the signal processing circuit 106 of FIG. 1 is supplied to an audio decoder circuit 22 and a selector 23. When the audio stream 21 is coded data, the audio stream 21 is decoded into PCM audio data by the audio decoder circuit 22 corresponding to the coding method.

The audio decoder circuit 22 comprises a first decoder circuit 27, a second decoder circuit 28 which is as an extension decoder circuit, and a matrix circuit 29. The PCM audio data of two-channels is output from the first decoder circuit 27 and the second decoder circuit 28 even if the input audio stream 21 is an encoded signal including PCM audio data of 5.1 multi-channels. Specifically, in the first decoder circuit 27, the encoded input audio stream 21 including the PCM audio data of 5.1 multi-channels is decoded into PCM audio data of two-channels which contains the 5.1 multi-channels elements of Left (L), and Right (R).

Moreover, in the second decoder circuit 28, the encoded input audio stream 21 including the PCM audio data of 5.1 multi-channels is decoded into PCM audio data which contains the 5.1 multi-channels elements except for the stereo elements of Left (L) and Right (R). In the matrix circuit 29, the PCM audio data of 5.1 multi-channels (L, C, R, Ls, Rs, LFE) is generated based on the PCM audio data supplied from the first decoder circuit which contains the stereo elements of Left (L) and Right (R) and the PCM audio data supplied from the second decoder as the extension decoder circuit which contains the 5.1 multi-channels elements except for the stereo elements of Left (L) and Right (R).

The PCM audio data of two-channels output from the first decoder circuit 27 and the PCM audio data of 5.1 multi-channels output from the matrix circuit 29 are supplied to the selector 23. In the selector 23, one of the input PCM audio data is selected and output. The PCM audio data of two-channels or the PCM audio data of 5.1 multi-channels output from the selector 23 is supplied to a postprocessing circuit 24 and a selector 25.

In the postprocessing circuit 24, processing such as virtual surround, pro logic, etc. is performed on the supplied PCM audio data of two-channels. The PCM audio data with which postprocessing has been performed in the postprocessing circuit 24 is supplied to the selector 25. In the selector 25, one of the PCM audio data with which the postprocessing has been performed and the PCM audio data with which the postprocessing has not been performed in the postprocessing circuit 24 is selected and output. The PCM audio data output from the selector 25 is supplied to the DAC 114 for the analog audio output.

Moreover, the audio stream 21, the PCM audio data output from the first audio decoder circuit 27, and the PCM audio data output from the selector 25 are supplied to a selector 26. Here, the PCM audio data output from the selector 25 is the signal output from the postprocessing circuit 24 or the signal output from the selector 23 supplied to the postprocessing circuit 24. In other words, the audio stream 21, the PCM audio data decoded by the first decoder circuit 27 and the PCM audio data output from the postprocessing circuit 24 are supplied to the selector 26.

In the selector 26, one of the input signals is selected and output, and the selected output signal is supplied to the IEC958 transceiver 115. In the selector 26, the coded data or the PCM audio data is output as the digital data when the audio stream 21 is selected, the PCM audio data of two-channels with which the decoding processing has been performed and the postprocessing has not been performed is output when the PCM audio data output from the first decoder circuit 27 is selected, and the PCM audio data with which the postprocessing has been performed is output when the PCM audio data output from the selector 25 is selected.

According to the third embodiment, the PCM audio data of two-channels with which the pro logic processing has not been performed is supplied to the IEC958 transceiver even when the pro logic processing is performed by the postprocessing on the PCM audio data in the postprocessing circuit for an analog audio data output.

Therefore, it is possible to reproduce the original audio data containing the element of Left and Right (L, R), Center (C), Left and Right rear surround (Ls, Rs), and Low Frequency Effect (LFE) at any time when an external DAC receives the digitized audio data output from the IEC958 transceiver. It is also possible to record the original audio data containing the element of Left and Right (L, R), Center (C), Left and Right rear surround (Ls, Rs), and Low Frequency Effect (LFE) at any time when recording the digitized audio data output from the IEC958 transceiver with external equipment.

Similarly, it is possible to supply the IEC958 transceiver the PCM audio data with which the virtual surround processing has not been performed even when virtual surround processing has been performed on the PCM audio data in the postprocessing circuit. Therefore, it is possible to record the original audio data with which the virtual surround processing has not been performed at any time when recording the digitized audio data output from the IEC958 transceiver with external equipment.

Moreover, according to the third embodiment, in addition to the effect obtained by the first embodiment, it is possible to supply the IEC958 transceiver the PCM audio data of two-channels even when the audio stream is the PCM audio data of 5.1 multi-channels or the coded PCM audio data of 5.1 multi-channels.

Therefore, it is possible to reproduce the original audio data containing the elements of Left and Right (L, R), Center (C), Left and Right rear surround (Ls, Rs), and Low Frequency Effect (LFE) at any time when an external DAC receives the digitized audio data output from the IEC958 transceiver. Similarly, it is possible to record the original audio data containing the element of Left and Right (L, R), Center (C), Left and Right rear surround (Ls, Rs), and Low Frequency Effect (LFE) at any time when recording the digitized audio data output from the IEC958 transceiver with external equipment.

The audio processing circuit 111 of this third embodiment is constituted as an integrated-circuit device by which circuit formation is carried out on a semiconductor substrate. As this integrated-circuit device, the DAC 114, the IEC958 transceiver 115, or both may be formed on one chip along with the audio processing circuit 111. Moreover, it may be constituted as one package including two or more chips having different circuit functions.

The above-mentioned embodiments are all examples, and not meant to limit the present invention. For example, it is possible to supply the output signal from the postprocessing circuit 4, 14, and 24 directly to the selector 6, 16, and 26 without selector 5, 15, and 25 in the above-mentioned embodiments.

Moreover, in the above-mentioned explanation, although the multi-channels are set to 5.1, the multi-channels are not limited to the 5.1 channels and could be set to the channels larger than two-channels, like three channels, four channels, and fifteen channels, etc.

In addition to the embodiment of above-mentioned digitized audio data reproduction apparatus which reproduce the digitized audio data recorded on the disc such as a CD and DVD, it is possible to apply the present invention to a digitized audio data reproduction apparatus which reproduce the digitized audio data recorded on a hard disc, a semiconductor memory device, and other recordable media, and the received digitized audio data is transmitted from outside. Moreover, it is possible to apply the present invention to an integrated circuit device used for such the digitized audio data reproduction apparatus.

The inventive system may also be conveniently implemented using a conventional general purpose computer or microprocessor programmed according to the teachings of the present invention, as will be apparent to those skilled in the computer art. Appropriate software can readily be prepared by programmers of ordinary skill based on the teachings of the present disclosure, as will be apparent to those skilled in the software art.

A general purpose computer may implement the method of the present invention, wherein the computer housing houses a motherboard which contains a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other optical special purpose logic devices such as ASICs (application specific integrated circuits) or configurable logic devices such GAL (generic array logic) and reprogrammable FPGAs (field programmable gate arrays).

The computer may also include plural input devices, (e.g., keyboard and mouse), and a display card for controlling a monitor. Additionally, the computer may include a floppy disk drive; other removable media devices (e.g. compact disc, tape, and removable magneto optical media); and a hard disk or other fixed high density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

As stated above, the system includes at least one computer program product which stores computer program instructions which when executed by a computer causes performance of the method of the present invention. Examples of computer program products include compact discs, hard disks, floppy disks, tape, magneto optical disks, PROMs (e.g., EPROM, EEPROM, Flash EPROM), DRAM, SRAM, SDRAM, etc., which may store the instructions singularly or in combination. The software, in which the computer instructions are embedded, is for controlling both the hardware of the computer and for enabling the computer to interact with a human user. Such software may include, but is not limited to, device drivers, operating systems and user applications, such as development tools. Such software, can be any interpreted or executable code mechanism, including but not limited to, scripts, interpreters, dynamic link libraries, Java classes, and complete executable programs.

The computer program product may also be implemented by the preparation of application specific integrated circuits (ASICs) or by interconnecting an appropriate network of conventional component circuits, as will be readily apparent to those skilled in the art.

While there has been illustrated and described embodiments of the present invention, it will be understood by those skilled in the art that various change and modifications may be made, and equivalents may be substituted for devices thereof without departing from the true scope of the invention. In addition, many modifications may be made to adapt a particular situation or material to the teaching of the present invention without departing from the central scope thereof. Therefore, it is intended that this invention not be limited to the particular embodiments disclosed, but that invention may include all embodiments falling within the scope of the appended claims.

What is claimed is:

1. An integrated circuit device comprising:
   a decoder circuit configured to decode an audio stream including coded data;
   a postprocessing circuit configured to process at least one of the audio stream and a signal output from the decoder circuit;
   a first selector configured to select at least one of a signal input to the postprocessing circuit and a signal output from the postprocessing circuit; and
   a second selector configured to select at least one of the audio stream, the signal output from the decoder circuit, and the signal output from the postprocessing circuit,
   wherein one of the audio stream and the signal output from the decoder circuit can be outputted through the second selector in parallel with the signal output from the postprocessing circuit outputted through the first selector.

2. The integrated circuit device according to claim 1, further comprising:
   a downmixing circuit configured to downmix at least one of the audio stream and the signal output from the decoder circuit into PCM audio data having two-channels when a signal input to the downmixing circuit is PCM audio data having multiple channels larger than two-channels,
   wherein the postprocessing circuit is a circuit configured to process at least one of the audio stream, the signal output from the decoder circuit, and a signal output from the downmixing circuit; and
   the second selector is further configured to select at least one of the audio stream, the signal output from the decoder circuit, the signal output from the postprocessing circuit, and the signal output from the downmixing circuit,
   wherein one of the audio stream, the signal output from the decoder circuit, and the signal output from the downmixing circuit can be outputted through the second selector in parallel with the signal output from the postprocessing circuit outputted though the first selector.

3. The integrated circuit device according to claim 1, wherein
   the decoder circuit comprises a first decoder circuit configured to decode the audio stream into PCM audio data having two-channels including stereo elements, a second decoder circuit configured to decode the audio stream into PCM audio data without the stereo elements, and a matrix circuit configured to generate PCM audio data having multiple channels larger than two-channels based on the PCM audio data supplied from the first decoder circuit and the second decoder circuit, and
   the second selector is further configured to select at least one of the audio stream, the signal output from the first decoder circuit, and the signal output from the postprocessing circuit,
   wherein one of the audio stream and the signal output from the first decoder circuit can be outputted through the second selector in parallel with the signal output from the postprocessing circuit outputted through the first selector.

4. The integrated circuit device according to claim 1, wherein the signal output from the first selector is supplied to a digital-to-analog conversion circuit.

5. The integrated circuit device according to claim 2, wherein the signal output from the first selector is supplied to a digital-to-analog conversion circuit.

6. The integrated circuit device according to claim 3, wherein the signal output from the first selector is supplied to a digital-to-analog conversion circuit.

7. The integrated circuit device according to claim 1, further comprising:
   a conversion circuit configured to convert an input signal into a digital signal conforming with a format of a telecommunications standard of digitized audio data,
   wherein a signal output from the second selector is supplied to the conversion circuit.

8. The integrated circuit device according to claim 2, further comprising:
   a conversion circuit configured to convert an input signal into a digital signal conforming with a format of a telecommunications standard of digitized audio data,
   wherein a signal output from the second selector is supplied to the conversion circuit.

9. The integrated circuit device according to claim 3, further comprising:
   a conversion circuit configured to convert an input signal into a digital signal conforming with a format of a telecommunications standard of digitized audio data,
   wherein a signal output from the second selector is supplied to the conversion circuit.

10. An audio data reproduction apparatus comprising:
    a decoder circuit configured to decode an audio stream including coded data;
    a postprocessing circuit configured to process at least one of the audio stream and a signal output from the decoder circuit;
    a first selector configured to select at least one of a signal input to the postprocessing circuit and a signal output from the postprocessing circuit; and
    a second selector configured to select at least one of the audio stream, the signal output from the decoder circuit, and the signal output from the postprocessing circuit,
    wherein one of the audio stream and the signal output from the decoder circuit can be outputted through the second selector in parallel with the signal output from the postprocessing circuit outputted through the first selector.

11. The audio data reproduction apparatus according to claim 10, further comprising:
    a conversion circuit configured to convert a signal output from the second selector into a digital signal conforming with a format of a telecommunications standard of digitized audio data.

12. The audio data reproduction apparatus according to claim 11, further comprising:
    a downmixing circuit configured to downmix at least one of the audio stream and the signal output from the decoder circuit into PCM audio data having two-channels when a signal input to the downmixing circuit is PCM audio data having multiple channels larger than two-channels,
    wherein the postprocessing circuit is further configured to process at least one of the audio stream, the signal output from the decoder circuit, and a signal output from the downmixing circuit; and
    the second selector is further configured to select at least one of the audio stream, the signal output from the decoder circuit, the signal output from the postprocessing circuit, and the signal output from the downmixing circuit, wherein one of the audio stream, the signal output from the decoder circuit, and the signal output from the downmixing circuit can be outputted through the second selector in parallel with the signal output from the postprocessing circuit outputted through the first selector.

13. The audio data reproduction apparatus according to claim 11, wherein the decoder circuit comprises a first decoder circuit configured to decode the audio stream into PCM audio data having two-channels including stereo elements, a second decoder circuit configured to decode the audio stream into PCM audio data without the stereo elements, and a matrix circuit configured to generate PCM audio data having multiple channels larger than two-channels based on the PCM audio data supplied from the first decoder circuit and the second decoder circuit, and the second selector is further configured to select at least one of the audio stream, the signal output from the first decoder circuit, and the signal output from the postprocessing circuit, wherein one of the audio stream and the signal output from the first decoder circuit can be outputted through the second selector in parallel with the signal output from the postprocessing circuit outputted through the first selector.

14. The audio data reproduction apparatus according to claim 11, further comprising:

a digital-to-analog conversion circuit configured to convert the signal output from the first selector into an analog signal.

15. The audio data reproduction apparatus according to claim 12, further comprising:

a digital-to-analog conversion circuit configured to convert the signal output from the first selector into an analog signal.

16. The audio data reproduction apparatus according to claim 13, further comprising:

a digital-to-analog conversion circuit configured to convert the signal output from the first selector into an analog signal.

17. The audio data reproduction apparatus according to claim 11, wherein the conversion circuit is an IEC958 transceiver.

18. The audio data reproduction apparatus according to claim 12, wherein the conversion circuit is an IEC958 transceiver.

19. The audio data reproduction apparatus according to claim 13, wherein the conversion circuit is an IEC958 transceiver.

20. An audio data reproduction apparatus comprising:

means for decoding an audio stream including coded data;

means for processing at least one of the audio stream and a signal output from the means for decoding;

a first selector configured to select at least one of a signal input to the means for processing and a signal output from the means for processing; and a second selector configured to select at least one of the audio stream, the signal output from the means for decoding, and the signal output from the means for processing, wherein one of the audio stream and the signal output from the means for decoding can be outputted through the second selector in parallel with the signal output from the means for processing outputted through the first selector.

* * * * *